R. F. BACON.
FLOTATION OF MINERALS.
APPLICATION FILED AUG. 14, 1914.
1,180,816.
Patented Apr. 25, 1916.
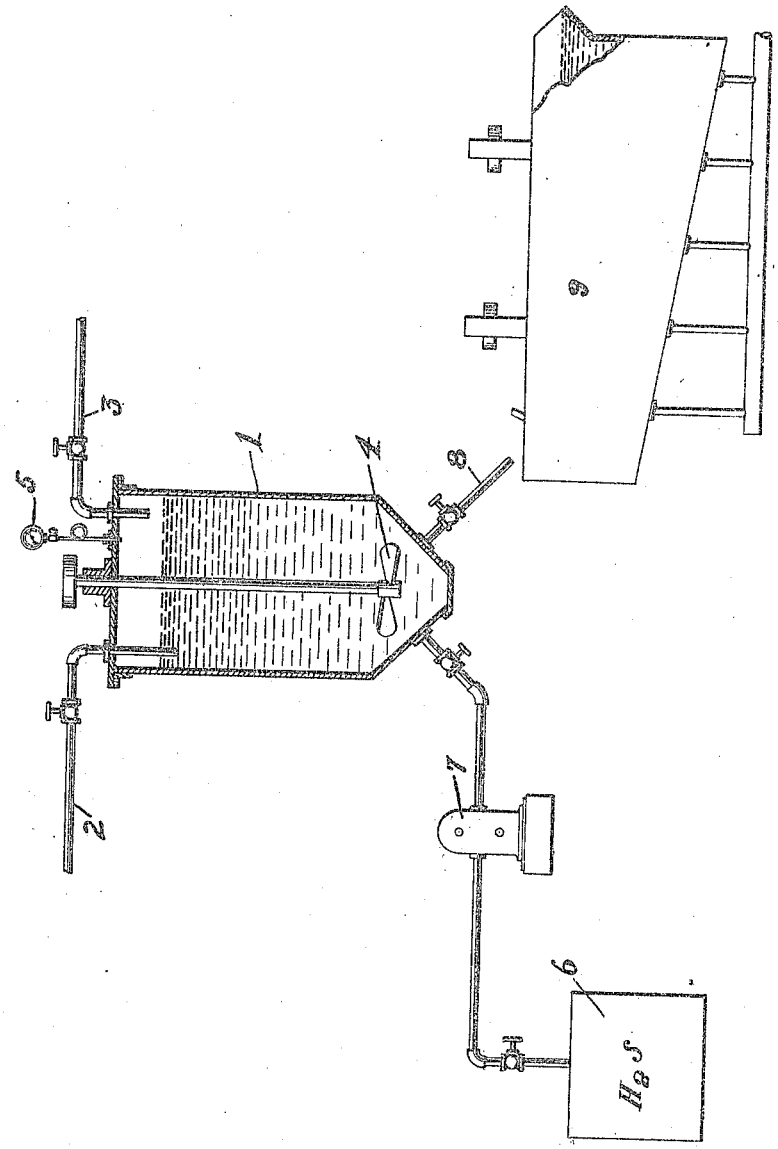
INVENTOR
Raymond F. Bacon
BY
Rennie Davis Goldsborough
ATTORNEYS

UNITED STATES PATENT OFFICE.

RAYMOND F. BACON, OF PITTSBURGH, PENNSYLVANIA, ASSIGNOR, BY MESNE ASSIGNMENTS, TO METALS RECOVERY COMPANY, A CORPORATION OF MAINE.

FLOTATION OF MINERALS.

1,180,816.  Specification of Letters Patent.  Patented Apr. 25, 1916.

Application filed August 14, 1914. Serial No. 856,773.

*To all whom it may concern:*

Be it known that I, RAYMOND F. BACON, a citizen of the United States, residing at No. 4909 Forbes street, Pittsburgh, Allegheny county, State of Pennsylvania, have invented certain new and useful Improvements in Flotation of Minerals; and I do hereby declare the following to be a full, clear, and exact description of the invention, such as will enable others skilled in the art to which it appertains to make and use the same.

The present invention relates to a method for effecting the flotation and separation of oxidized ores from the gangue with which they are associated, by first converting the oxidized ores, in a finely divided condition, into sulfids by the action of a soluble sulfid, such as hydrogen sulfid, and then subjecting the ore to any of the familiar processes for effecting the separation of sulfids from gangue.

I have discovered that the efficiency of the flotation is greatly enhanced by subjecting the oxidized ore to the action of the hydrogen sulfid (or other soluble sulfid) under pressure. Thus, for instance, the finely divided ore, slimes, or the like, are first admitted into an iron receptacle, capable of resisting, with safety, the contemplated internal pressure, a quantity of water (which may conveniently amount to three times the weight of the ore) is likewise admitted to the receptacle. The receptacle is then closed and hydrogen sulfid, under pressure, (preferably a pressure of 20 pounds per square inch) is admitted until a pressure gage on the closed receptacle indicates the existence of such pressure within its interior. The pressure is then released, the receptacle is opened, and the mixture is then subjected to flotation. The conversion of the oxidized ore by the hydrogen sulfid under pressure, apparently results in the formation of a sulfid having different physical properties than the sulfid produced by the action of hydrogen sulfid under ordinary atmospheric pressure, and these different physical properties adapt the converted ore particles more fully and completely into material susceptible to flotation by oil.

A suitable apparatus for the practice of the invention is illustrated, partly in section, and partly in elevation, in the accompanying drawing; but it will of course be understood that the invention is not limited to any specific form or forms of apparatus.

In the drawing, 1 indicates the vessel in which the ore and water is received, and which may be provided with a rotary propeller or stirrer or beater 4. Suitable pipes 2 and 3, are provided for the introduction of the ore and oil (where oil is used), and a pressure gage 5 is provided for indicating the pressure within the vessel. Hydrogen sulfid is generated at 6 and forced into the vessel 1, under a suitable pressure by means of the pump 7. From the vessel 1, the treated ore is discharged through the outlet pipe 8 to the flotation tank or cell 9, which may be of any suitable type.

In practising the process, in the apparatus illustrated, the hydrogen sulfid is pumped into the vessel 1 under a suitable pressure, such as that referred to above; or the hydrogen sulfid is pumped in until the pressure has reached the proper degree. The vessel 1, as indicated above, is capable of resisting with safety, the contemplated internal pressure.

What I claim is:

1. The method of effecting the separation of oxidized ores from associated gangue, which consists in subjecting the mixture, in a finely divided condition, to the action of hydrogen sulfid under pressure, and finally subjecting the mixture to flotation; substantially as described.

2. The method of effecting the separation of oxidized ores from associated gangue, which consists in subjecting the mixture, in a finely divided condition, to the action of hydrogen sulfid under a pressure as high as 20 pounds to the square inch, and finally subjecting the mixture to flotation; substantially as described.

In testimony whereof I affix my signature, in presence of two witnesses.

RAYMOND F. BACON.

Witnesses:
N. A. PARKINSON,
E. B. TELFORD.